(No Model.)
H. E. KELLEY.
CHAIN LINK.
No. 396,404. Patented Jan. 22, 1889.
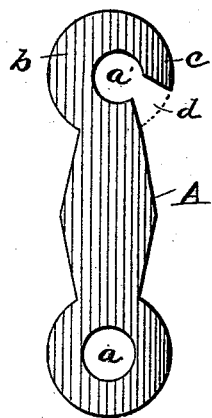
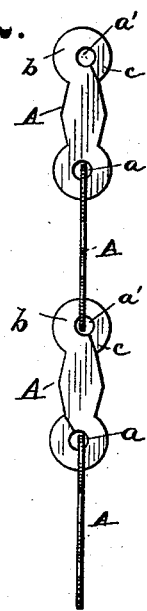
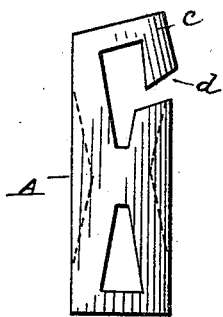
WITNESSES
H. D. Nealy.
E. F. Drew.
INVENTOR
H. E. Kelley
by J. R. Drake.
Attorney

UNITED STATES PATENT OFFICE.

HARRY EUGENE KELLEY, OF NIAGARA FALLS, NEW YORK.

CHAIN-LINK.

SPECIFICATION forming part of Letters Patent No. 396,404, dated January 22, 1889.

Application filed July 7, 1888. Serial No. 279,261. (No model.)

*To all whom it may concern:*

Be it known that I, HARRY EUGENE KELLEY, a citizen of the United States, residing at Niagara Falls, in the county of Niagara and State of New York, have invented certain new and useful Improvements in Chain-Links; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to make a cheap and light link that will be strong and require no welding or hand labor beyond making a "cold-shut" when the links are united to each other; and the invention consists in stamping out of sheet metal chain-links, leaving one side or end open, to be afterward closed, all as fully hereinafter explained.

In the drawings, Figure 1 represents the blank or one link as stamped out; Fig. 2, several links of the same when united; Fig. 3, a variation in shape only of one link.

A represents in all the figures the link stamped or cut out of sheet metal of any desirable size, thickness, or form, the center being solid or continuous, the lower end rounded, square, or oblong, having an opening, $a$, for the next link A, as shown. The upper opening, $a'$, is stamped out, as in Fig. 1, the side $b$ made a little wider than the opposite one, $c$, and a slot or space, $d$, left. (This is accomplished by the shape of the die.) The wider side $b$ extends up nearly to the top, and is to give greater strength there to counteract the opening $d$ opposite. When the closed end $a$ of the next link is put in the slot $d$, it is closed by what is known as a "cold-shut," either by a hammer or otherwise, driving or forcing the open end $c$ against the side A, as shown in Fig. 2, and which is done in an instant. Of course both ends may be stamped out with the open eye $a'$ $d$, if desired; but it would make only more work, and one end open is thought sufficient for cheapness, strength, and quick work; but for joining with chains of other patterns it would be convenient if both ends were open.

The form or shape of the links is unimportant, being stamped out of sheet metal and having the single or double opening, to be closed by a cold-shut, is the main feature and object. Fig. 3 shows a variation as to form or shape, and the dotted lines thereon show how it may be made lighter in weight, the principle of construction being precisely the same as in Fig. 1. It is superior to the bent-link chain, as it cannot be injured by being stepped on by animals or run over by wagons. It is stronger than other chains having the same weight of metal, and lighter and more durable than any other chain of equal strength.

I claim—

1. A flat chain-link, A, stamped or cut out of sheet metal, one end having a hole at $a$ for the reception of the next link at that end, the other end having the link-opening $a'$, and slot $d$ continuing therefrom and adapted to receive the next link and to be closed edgewise against the edge of the link itself, making a cold-shut, substantially as specified.

2. As a new article of manufacture, the flat chain-link A, made from sheet metal and having an open end or ends, $a'$ $d$, and the side or end $c$, adapted to be shut against the edge of the link A, substantially as set forth.

In testimony whereof I affix my signature in presence of two witnesses.

HARRY EUGENE KELLEY.

Witnesses:
J. R. DRAKE,
GEO. B. BURRETT.